3,322,708
POLYPROPYLENE COMPOSITIONS
Ernest V. Wilson, Cranford, N.J., assignor to Esso Research and Engineering Company, a corporation of Delaware
No Drawing. Filed May 17, 1965, Ser. No. 456,473
12 Claims. (Cl. 260—28.5)

This application is a continuation-in-part of application Ser. No. 175,303, filed Feb. 23, 1962. The present invention relates to improved polypropylene compositions. Particularly, it relates to improved polypropylene compositions containing petroleum wax and a co-solvent to suppress wax bloom. The invention also relates to the use of such compositions in polypropylene fabrication operations.

The use of solid, resinous polypropylene plastics in various commercial applications such as injection molding, blow molding, extrusion or other methods of forming shaped articles under heat and pressure is well known. It has recently been discovered that by dissolving petroleum wax into polypropylene the wax will act as a low-cost extender, thereby substantially reducing the material cost in polypropylene fabrication operations, and in addition the wax will frequently improve a number of physical properties of the polypropylene. The particular application and the intended end use of the polypropylene will generally determine which physical property is to be improved. For example, wax has been found to decrease the water vapor transmission rate of extruded polypropylene coating for milk cartons and the like. Wax incorporation has also been found to improve the low temperature impact resistance of polypropylene so as to enhance its usefulness as a packaging material for frozen foods, as a wire and cable insulation, etc.

In certain applications the use of such polypropylene-wax compositions has sometimes proved to be unsatisfactory because of the tendency of the dissolved wax to crystallize and exude to the surface of the plastic, thereby resulting in a dull cloudy appearance, commonly known as a wax "bloom," arising from incompatability of the wax with the polypropylene. This wax bloom prohibits the use of the polypropylene-wax compositions in certain applications where a permanent, clear, glossy material is required, such as in transparent food wrappings, package coatings, etc. The appearance of transparent and colored, opaque and translucent molded polypropylene objects may also be marred by this tendency where a glossy surface is desired.

It has now been found that the incorporation of suitable co-solvents to the polypropylene-wax compositions will eliminate the above-mentioned wax "blooming" tendency and will enable the formation of permanently transparent and water-white polypropylene films and coatings, and glossy molded objects, without impairing the beneficial effect of the wax on the polypropylene. These co-solvents tend to dissolve both the wax and the polypropylene resin.

The co-solvents that have been found to be useful for the present invention may be characterized as copolymers of ethylene and unsaturated esters of aliphatic monocarboxylic acids in which the total number of carbon atoms in the ester ranges from about 3 to about 15. These esters are of two types: esters of unsaturated aliphatic alcohols of from 2 to 3 carbon atoms, i.e., vinyl alcohol or allyl alcohol, and saturated aliphatic monocarboxylic acids of from 1 to 12 carbon atoms; and esters of saturated aliphatic alcohols of from 1 to 12 carbon atoms and unsaturated aliphatic monocarboxylic acids of from 2 to 3 carbon atoms, i.e., acrylic acid or methacrylic acid. Examples of esters of the first type are allyl acetate, vinyl octoate, vinyl propionate, allyl formate, vinyl acetate, vinyl pentanoate, allyl butyrate, vinyl dodecanoate and vinyl hexanoate. Examples of esters of the second type are methyl methacrylate, ethyl acrylate, propyl methacrylate, lauryl methtacrylate, octyl acrylate, amyl acrylate, butyl methacrylate, and heptyl acrylate. Particularly useful are the esters of the above two types in which the total number of carbon atoms ranges from 3 to 9 carbon atoms, i.e., vinyl esters or allyl esters of saturated aliphatic monocarboxylic acids having in the range of 1 to 5 carbon atoms, and methyl to amyl esters of acrylic acid or of methacrylic acid. The vinyl alcohol esters of $C_1$ to $C_5$ saturated aliphatic monocarboxylic acids are particularly preferred.

The copolymers suitable for use as co-solvents in the present invention can be prepared by copolymerizing a mixture of ethylene and an unsaturated ester of the types described above in the presence of catalyst, such as oxygen, or an organic peroxide, such as t-butyl hydroperoxide, tert. butyl perbenzoate, or the like, at pressures of from about 1000 to 30,000 p.s.i.g. and temperatures from about 280° F. to about 500° F., and then separating the resultant copolymer from the unreacted monomers by distillation. By varying the conditions of pressure, temperature, catalyst concentration, and unsaturated ester content in the monomer mixture, one can obtain copolymers having different molar ratios of ethylene to unsaturated ester. The resulting copolymers useful in the present invention may have molar ratios of ethylene to ester within the range of about 1:1 to 15:1, more usually 1:1 to 10:1 and Staudinger molecular weights of about 2,000 to about 1,000,000. Particularly useful molecular weights are about 3,000 to 500,000.

In general, the compositions of this invention will comprise a major proportion of polypropylene, an extending amount of petroleum wax, for example, about 1 to 35 wt. percent, and preferably about 5 to 25 wt. percent petroleum wax; and a wax bloom suppressing amount of co-solvent, for example, about 0.5 to 15 wt. percent, and preferably about 1 to 10 wt. percent of co-solvent. The above weight percents are based on the total weight of the composition.

In addition, other additive materials may also be included such as dyes and coloring agents, oxidation inhibitors, processing aids, etc. The choice of such optional conventional additive materials will depend upon the end use of the particular blend in question and will be readily determined by persons skilled in the art.

The high molecular weight polypropylene employed in the present invention will generally have a Staudinger molecular weight within the range of 2,000 to 500,000 and will include those prepared by the older conventional high pressure polymerization of propylene which forms amorphous or low density polypropylene, or by the newer low pressure polymerization of propylene in the presence of an alkyl metal catalyst which forms linear, crystalline, high density polypropylene.

High molecular weight polypropylene of the "high pressure" variety is produced, for example, by compressing propylene gas to a high superatmospheric pressure in excess of 500 atmospheres, preferably to within the range of about 1,000 to 3,000 atmospheres. The propylene reacts under controlled temperature conditions, preferably with a small quantity of oxygen admixed in order to catalyze the polymerization. The polymerization proceeds at moderately elevated temperatures in the range of 200° F. to 750° F., and preferably the temperature is kept in the range of 300° F. to 500° F. For a given concentration of oxygen, the molecular weight of the polymer is greater when the polymerization proceeds at elevated pressures and relatively low temperatures. The optimum concentrattion of oxygen is in the range of 0.01% to about 3%.

High molecular weight polypropylene of the "low pressure variety" can be produced by polymerizing propylene with the aid of certain recently developed polymerization catalysts.

One type of such catalysts are the solid, insoluble reaction products obtained by partially reducing a heavy metal compound, usually the halide of a Group IV–B, V–B or VI–B metal of the Periodic System, such as vanadium tetrachloride, or a titanium halide, e.g. $TiCl_4$, $TiBr_4$, etc., preferably with metallic aluminum. The preferred catalyst of this type is usually prepared by reducing 1 mole of titanium tetrahalide, usually tetrachloride, with about ⅓ mole of aluminum to give a material corresponding to $TiCl_3 \cdot 0.33AlCl_3$, thus containing cocrystallized $AlCl_3$. The product is then activated with an aluminum alkyl compound corresponding to the formula RR'AlX. In this formula, R, R' and X are preferably alkyl groups of 2 to 8 carbon atoms, although X may alternatively be hydrogen or a halogen, notably chlorine. Typical examples of the aluminum compounds are aluminum triethyl, aluminum sesquichloride, aluminum triisobutyl, etc.

The waxes that are found suitable for the present invention are the petroleum waxes of the type that occur naturally in crude petroleum, as distinguished from the synthetic waxes produced by chemical reaction techniques, or the natural animal and vegetable waxes. These petroleum waxes may be of the paraffin or microcrystalline variety.

Specifically, suitable petroleum waxes will have melting points of 120° to 200° F., preferably 135° to 185° F. In addition, they may contain 0.01 to 5 wt. percent or more, but preferably 0.1 to 2 wt. percent mineral oil, and usually will have a 5 to 95% boiling range of 430° to 680° F., preferably 460° to 620° F., expressed at 10 mm. Hg pressure. These waxes are produced by the fractional distillation of petroleum and subsequent purification by conventional methods such as solvent dewaxing, deoiling, sweating, pressing, etc.

The blending of the wax, polypropylene and copolymer may be accomplished with conventional blending equipment such as a roll mill. The pellets of the polypropylene and copolymer may be fed to the roll mill and milled at the appropriate temperature which may vary from 200° to 500° F. When the polymers have fused and formed a band around one of the rolls, a desired proportion of wax granules is added. Blending is accomplished by the shearing action of the roll mill and may be manually aided by periodically cutting the band and allowing it to reform. Alternatively the blending may be accomplished by feeding a dry mix of wax granules, and polypropylene and copolymer pellets in the desired proportions directly to the hopper of an extruder, for example, whereby intimate blending is accomplished in the extruder just prior to extrusion of the final product. If a greater degree of blending is desired, the dry mix may be fed initially to the hopper of a separate extruder equipped with an appropriate die, so as to produce strands of extruded blended material. These strands may then be chilled and repelletized, and the resulting pellets then used for the desired fabrication operation.

The resulting composition may be used in any conventional plastic fabricating operation, e.g. injection molding, blow molding, extrusion, etc. For example, a typical extrusion operation comprises employment of a screw device for advancing the plastic material through zones of controlled temperature. The feed granules are continuously fed from a hopper to the extruder. The screw of the extruder rotates in a closely fitting cylinder. The material melts as it passes through the heated zone, and is then forced by the rotating screw through an orifice or die from which it emerges with a cross-section complementary to the die. The extruded material may then be air cooled, allowed to cool naturally, or be cooled more rapidly by immersion in water or other fluid.

Generally, in the extrusion of unsupported films, a slit die is used to form a semi-molten web of plastic which is then fed to a revolving chill roll proximate the die, e.g. 3 inches from the die. This chill roll stretches the film and also removes the heat from the plastic, thereby causing it to solidify. The thickness of the film is controlled by such factors as the speed and temperature of the chill roll, the throughput of the extruder, the length of the air gap between the extruder and the chill roll. Alternatively, a water bath may be used in place of the chill roll, in which case the semi-molten web enters the bath and leaves as a solid film.

As another example, supported plastic coatings, e.g. plastic coated paper, are generally produced by a similar chill roll operation, except that the chill roll rotates in contact with a rubberized pressure roll. The semi-molten web and the substrate, i.e. the support for the plastic, e.g. paper, are fed between the two rollers so that they are pressed together. The chill roll removes the heat and the film emerges bonded to the substrate.

The invention will be better understood by reference to the following examples which are given for illustration purposes only and are not intended to limit the invention.

EXAMPLE 1

*Part A.*—Blends of polypropylene and wax were prepared for the extrusion of supported coatings on substrate. The clear polypropylene used was identified by the tradename Escon 103, distributed by Enjay Chemical Company. It was prepared by the low pressure technique and had a density of 0.90 and a Staudinger molecular weight of about 350,000. The wax used was a paraffin wax, having a melting point of 150° F., a 5 to 95% boiling range of 546° F. to 620° F. at 10 mm. Hg pressure, and a mineral oil content of 0.15 wt. percent. Blends of 5 wt. percent and 10 wt. percent wax (based on the total weight of the composition) were prepared as follows:

The desired proportions of polypropylene pellets and wax granules were pre-blended by feeding them to an extruder, which mixed and extruded strands of blended material at 400° F. The extruded strands were subsequently chilled and broken into pellets.

The new pellets of wax and polypropylene were then fed to extrusion coating equipment which consisted of a two-inch, 16 to 1 ratio of length to diameter, Egan extruder with a 24-inch Egan coater. The equipment utilized a chill roll to bond the film permanently to the substrate. The substrate was 50 lb. kraft paper, 5 mils thick. The extrusion was carried out at a temperature of 635° F. at the barrel, i.e., the melting zone of the extruder, and 580° F. at the die. The chill roll temperature was 150° F. and the screw speed was 72 r.p.m.

The extrusion pressures and power consumptions were observed to give an indication of the processability of the blends. The films and coatings were evaluated by the water vapor transmission test (ASTM E 96–53T Procedure E), and the Mullen Burst Strength Test. The latter is a measure of the pressure required to burst a film or a coated paper when it is held against an inflating rubber diaphragm.

The appearance of the coatings after a short aging period was observed. The results are shown in Table I.

TABLE I.—EXTRUSION COATING OF POLYPROPYLENE

| Wt. Percent Paraffin Wax | 0% | 5% | 10% |
| --- | --- | --- | --- |
| Extrusion Pressure (p.s.i.g.) | 903 | 780 | 650 |
| Coating Thickness (mils) | 1.5 | 1.5 | 1.5 |
| Water Vapor Transmission gm./100 in. 2/24 hrs./mil | 0.70 | 9.43 | 0.44 |
| Mullen Burst Strength (p.s.i./mil) | 31 | 29 | 34 |
| Physical Appearance of Plastic Coating one hour after extrusion | Clear | Hazy | Hazy |

As indicated in Table I, the beneficial effect of the wax in reducing the required degree of extrusion pressure, reducing water vapor transmission, and, in the case of the 10% wax composition, even improving the bursting strength of the coated paper, was offset by the hazy appearance of the plastic coating, which hazy appearance would limit its use for many applications.

*Part B.*—Two blends were prepared in a 6-inch roll mill at 310–320° F. The first blend contained 90 wt. percent polypropylene, 5 wt. percent paraffin wax, and 5 wt. percent of co-solvent. The second blend contained 95 wt. percent polypropylene and 5 wt. percent wax.

The polypropylene and wax were of the same type as described in Part A. The co-solvent was a polymer of ethylene and vinyl acetate having a Staudinger molecular weight of about 300,000 and an ethylene-to-vinyl-acetate molar ratio of 2:1 in the polymer. The blends were extruded as unsupported film with a 6-inch Killion Extruder which utilizes a water bath for chilling the extruded film.

The object of the test was to determine the effect of the co-solvent in improving the physical appearance of the film. In particular, the ability of the co-solvent to eliminate the wax "bloom" was observed. The data are presented in Table II.

TABLE II.—EFFECT OF CO-SOLVENT ON PHYSICAL APPEARANCE OF WAX-POLYPROPYLENE FILMS

| Composition | Physical Appearance of Films |
| --- | --- |
| 100% Polypropylene | Clear, water white film; retained gloss and clarity after 7 weeks. |
| 95% Polypropylene, 5% Paraffin Wax. | Initially clear and glossy; developed heavy wax "bloom" after one hour. |
| 90% Polypropylene, 5% Paraffin wax, 5% Co-solvent (Ethylene-vinyl acetate polymer). | Clear, water white film; retained gloss and clarity after 7 weeks. |

As shown in Table II, the co-solvent (ethylene-vinyl acetate copolymer) is extremely effective in eliminating the wax "bloom" from the plastic-wax film and in producing a permanent clear and glossy appearance. This is especially important in certain applications such as wrappings, coatings, and the like.

EXAMPLE 2

A copolymer of vinyl acetate and ethylene is prepared by charging a 10 wt. percent solution of vinyl acetate in benzene to a pressure reactor, injecting ethylene into the reactor to a pressure of about 1,000 p.s.i.g., with the reaction mixture heated to 300° F., additional vinyl acetate in benzene solution is added along with di-tert. butyl peroxide as a polymerization initiator, and additional ethylene is injected to maintain the 1,000 p.s.i.g. pressure. In this manner there is obtained in a 2-hour reaction period from 365 grams of vinyl acetate using 20 grams of peroxide initiator, 810 grams of a 3,000 mol. wt. copolymer of 37 wt. percent acetate and 63 wt. percent ethylene.

The copolymer thus obtained is blended on a roll mill with a paraffin wax of 140° F. melting point and 0.1 percent oil content and a polypropylene of 0.91 density and 100,000 Staudinger molecular weight, in the proportions of 86 wt. percent of the polypropylene, 10 wt. percent of the paraffin wax and 4 wt. percent of the copolymer.

EXAMPLE 3

A blend of 78 parts by weight of 0.87 density polypropylene of 450,000 molecular weight and 7 parts by weight of a 20,000 molecular weight copolymer of 18 wt. percent methyl methacrylate and 82 wt. percent ethylene is prepared by milling the two polymeric materials together on a roll mill. Milling is continued while 15 parts by weight of a paraffin wax of 136° F. melting point is worked into the blend. The resulting mixture is then fed to an extruder to form a clear homogeneous film.

EXAMPLE 4

A blend of 84 parts by weight of polypropylene of 250,000 molecular weight and 0.89 density, 11 parts by weight of microcrystalline wax of 170–173° F. melting point, and 5 parts by weight of a copolymer of ethylene and ethyl acrylate is prepared by feeding the materials to an extruder. The ethylene-ethyl acrylate copolymer has a molecular weight of 30,000 and an ethylene to ethyl acrylate molar ratio of 10 to 1. The extruded material is then re-extruded and fed to a coating machine to apply the blend as a clear coating on a web of paper substrate.

It is to be understood that this invention is not limited to the specific examples, which have been offered merely as illustrations, and that modifications may be made without departing from the spirit of the invention.

What is claimed is:

1. A solid homogeneous composition of matter comprising a major proportion of a solid polypropylene resin having a molecular weight in the range of about 100,000 to 500,000 Staudinger, a minor proportion, in the range of about 1 to about 35 percent by weight, of petroleum wax having a melting point in the range of about 120° to about 200° F., said wax being selected from the group consisting of paraffin waxes and microcrystalline waxes, and a minor proportion, in the range of from about 0.5 to about 15 weight percent of a co-solvent for said wax, said wax being dissolved in said polypropylene resin but normally tending to crystallize from said resin and form a wax bloom, said co-solvent being effective to prevent said wax bloom, said co-solvent being a copolymer of ethylene and an unsaturated ester selected from the group consisting of vinyl alcohol esters of saturated $C_1$ to $C_{12}$ aliphatic monocarboxylic acids, acrylic acid esters of $C_1$ to $C_{12}$ saturated aliphatic monohydric alcohols, and methacrylic acid esters of $C_1$ to $C_{12}$ saturated aliphatic monohydric alcohols, said copolymer having a molecular weight in the range of about 3,000 to 500,000 and a molar ratio of ethylene to unsaturated ester in the range of 1:1 to 15:1.

2. A composition according to claim 1 wherein said co-solvent is a copolymer of ethylene and a vinyl ester of a saturated aliphatic monocarboxylic acid containing in the range of 1 to 5 carbon atoms.

3. A composition according to claim 1 wherein said unsaturated ester has a total number of carbon atoms within the range of from 3 to 9.

4. A composition according to claim 1 wherein the concentration of wax is within the range of about 5 to 25 wt. percent and the concentration of co-solvent is within the range of about 1 to 10 wt. percent.

5. A composition according to claim 1, wherein said co-solvent is a copolymer of ethylene and a vinyl alcohol ester of a saturated aliphatic monocarboxylic acid having in the range of 1 to 12 carbon atoms.

6. A composition according to claim 1 wherein said co-solvent is a copolymer of ethylene and vinyl acetate.

7. A composition according to claim 1 wherein said co-solvent is a copolymer of ethylene and ethyl acrylate.

8. A composition of matter according to claim 1 wherein said co-solvent is a copolymer of ethylene and methyl methacrylate.

9. A molded article comprising the composition of matter defined by claim 1.

10. A composition according to claim 1 wherein the petroleum wax has a 5 to 95% boiling range of 430° F. to 680° F. at 10 mm. Hg pressure, and a mineral oil content of 0.01 to 5 weight percent.

11. A plastic homogeneous composition of matter comprising 65 to 94 wt. percent of polypropylene resin having a molecular weight in the range of about 100,000 to 500,000 Staudinger; 5 to 25 wt. percent crystalline petroleum wax having a melting point in the range of 135° to 185° F., a 5 to 95 wt. percent boiling range of 460° F. to 620° F. at 10 mm. Hg pressure, and a mineral oil content in the range of about .1 to 2 wt. percent; and 1 to 10 wt. percent of an ethylene-vinyl acetate copolymer having an ethylene to vinyl acetate molar ratio in the range of 1:1 to 5:1 and a Staudinger molecular weight in the range of about 50,000 to about 500,000.

12. A molded article comprising the composition of matter defined by claim 11.

References Cited

UNITED STATES PATENTS

| | | | |
|---|---|---|---|
| 2,728,735 | 12/1955 | Anderson | 260—28.5 |
| 3,048,551 | 8/1962 | Lutz | 260—28.5 |
| 3,135,379 | 6/1964 | Naudain | 260—28.5 |
| 3,146,214 | 8/1964 | Jakaitis et al. | 260—28.5 |
| 3,155,631 | 11/1964 | Zapp | 260—28.5 |
| 3,163,492 | 12/1964 | Thomas | 260—897 |
| 3,201,364 | 8/1965 | Salyer | 260—33.6 |
| 3,201,498 | 8/1965 | Brunson et al. | 260—897 |
| 3,205,186 | 9/1965 | Zaayenga | 260—28.5 |
| 3,226,455 | 12/1965 | Matusbayashi et al. | 260—897 |

FOREIGN PATENTS

| | | |
|---|---|---|
| 902,809 | 8/1962 | Great Britain. |
| 1,287,912 | 2/1962 | France. |
| 1,294,699 | 4/1962 | France. |

OTHER REFERENCES

Bennett, "Commercial Waxes," second edition, Chemical Publishing Company, Inc., New York, N.Y., 1956, pp. 18–21.

MORRIS LIEBMAN, *Primary Examiner.*

B. A. AMERNICK, *Assistant Examiner.*